May 9, 1950 A. H. KELCH, JR 2,506,601
FOLDABLE BABY BUGGY
Filed Dec. 13, 1945
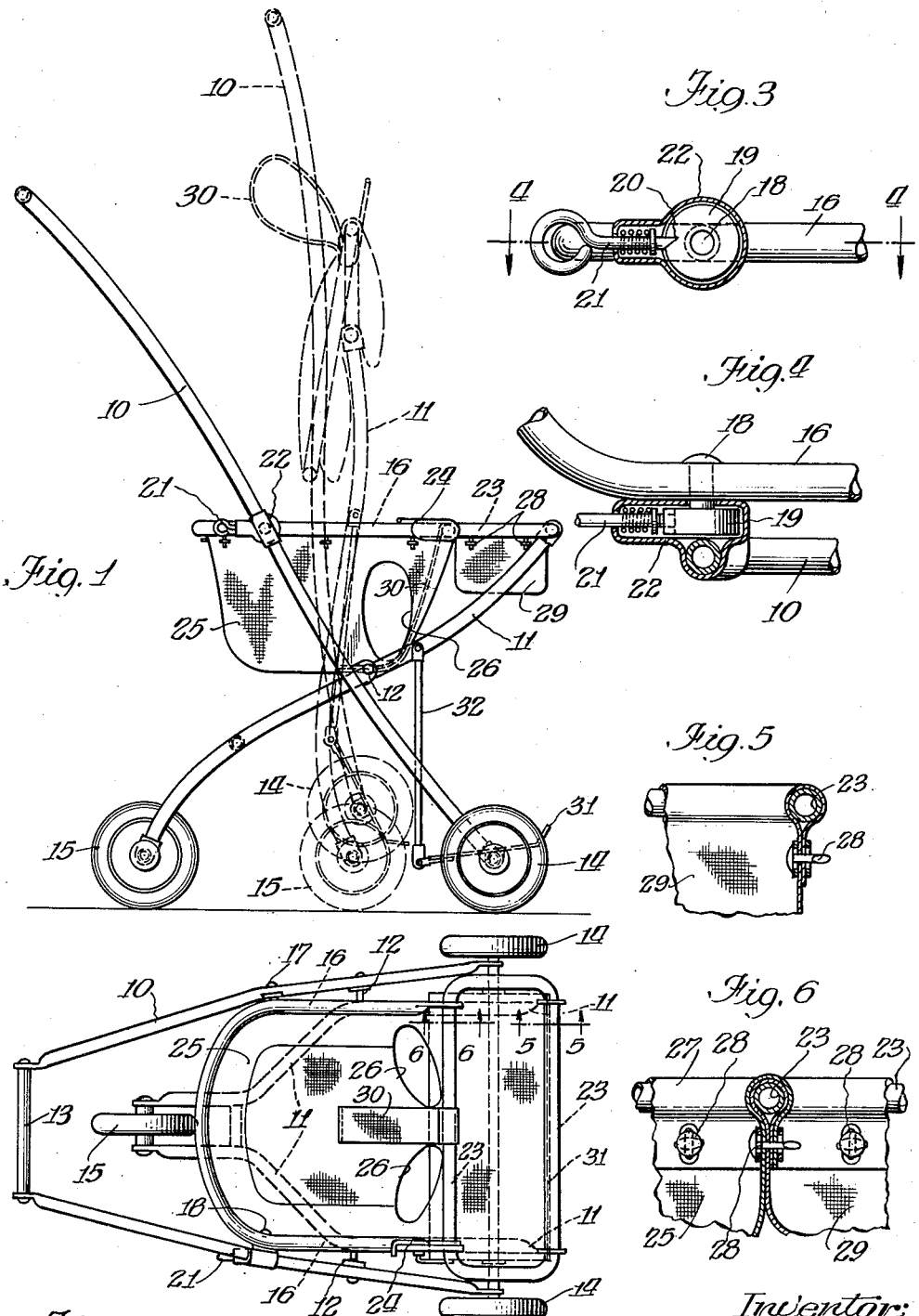
Inventor:
Alfred H. Kelch Jr.
By: Brayton Richards
Attorney.

Patented May 9, 1950

2,506,601

UNITED STATES PATENT OFFICE 2,506,601

FOLDABLE BABY BUGGY

Alfred H. Kelch, Jr., Chicago, Ill.

Application December 13, 1945, Serial No. 634,665

2 Claims. (Cl. 280—36)

The invention relates to improvements in foldable baby buggies and has for its primary object the provision of an improved construction of the character indicated which may be readily folded for carrying, and extended for use, and which is capable of economical production.

Other objects will appear hereinafter.

The invention consists of the combinations and arrangements of parts hereinafter described and claimed.

The invention will be best understood by reference to the accompanying drawings forming a part of this specification and in which—

Fig. 1 is a side view of a baby buggy embodying the invention;

Fig. 2, a top plan view of the same;

Fig. 3, an enlarged sectional view of a latch joint employed in the construction;

Fig. 4, a partial section taken substantially on line 4—4 of Fig. 3;

Fig. 5, an enlarged section taken substantially on line 5—5 of Fig. 2; and

Fig. 6, an enlarged section taken substantially on line 6—6 of Fig. 2.

The embodiment of the invention illustrated in the drawings comprises a main frame 10 extending forwardly and downwardly in the buggy as shown, and co-operating with a supplemental frame 11 pivoted to said main frame at points 12 for folding, as indicated by the dotted lines in Fig. 1. The main frame is provided at its top with a handle bar 13 and at its bottom with wheels 14, and the supplemental frame 11 is provided at its bottom with a single wheel 15, the arrangement being such that when the two frames are folded the frame 15 projects well below the wheels 14 for a purpose to be hereinafter explained.

A side supporting frame 16 which is substantially U-shaped in form, is pivoted at the points 17 and 18 in the main frame 10 and extends both forwardly and rearwardly from said pivot points as shown. The pivot 18 carries a latch hub 19 having a notch 20 co-operating with a spring latch 21 in the housing 22 enclosing said hub, and whereby said frame 16 will be releasably held against upward swinging in said main frame, as will be readily understood.

A tray frame 23 is pivotally connected at its forward side with the upper part of the supplemental frame 11, extending thence rearwardly, being pivotally connected at its rear with the forward end of the frame 16 as shown. A stop bar 24 is attached to the rear bar of the frame 23 and is arranged to contact with the top of the corresponding side bar of the frame 16 to limit the downward swinging of said frames.

The frame 16 carries a basket-like seat member 25 having leg holes 26 therein, adapted and arranged to serve as a support for a baby, as will be readily understood. The seat member 25 is secured in the frame 16 by having its upper edges 27 extended around the bars of said frame, and secured in place by means of carriage curtain buttons 28, as indicated. A tray member 29 is likewise secured in the frame 23 by having its edges extend around the bars of said frame and secured in place by means of carriage curtain buttons 28 as indicated.

The seat member 25 and the tray member 29 are both preferably formed of canvas or similar flexible material and are thus rendered readily detachable so that the same may be washed when desired. A loop 30 is secured, as indicated, to the forward part of the seat 25 to serve as a means for hanging the buggy on the arms of the user when the same is folded, to facilitate transportation, as indicated in dotted lines of Fig. 1.

A foot rest 31 is pivotally mounted on the lower bar of the frame 10 and is connected by a link 32 with the frame 11, and so arranged that when the buggy is distended said foot rest is in proper position for supporting the feet of the baby in the seat 25, but readily folds when the frames 10 and 11 are folded, as indicated by the dotted lines in Fig. 1. By this arrangement a foldable baby buggy is provided which is of simple construction and highly efficient in use.

By arranging the rear wheel 15 to extend below the wheels 14 when the buggy is folded, said rear wheel 15 will contact alone with the ground when it is desired to extend the buggy, thereby permitting of the extension thereof by mere downward pressure on the frame 10. When it is desired to fold the buggy, the foot is placed against the rear wheel 15, whereupon the same may be readily folded by a slight forward movement of the frame 10. The specific form and arrangement of parts is a simple and effective one for the purpose.

While I have illustrated the preferred form of construction for carrying the invention into effect, this is capable of variation and modification without departing from the spirit of the invention. I therefore do not wish to be limited to the precise details disclosed, but desire to avail myself of such variations and modifications as fall within the scope of the appended claims.

I claim:

1. A foldable baby buggy comprising a main wheel frame extending forwardly and downwardly therein; a supplemental frame pivoted to said main frame and extending downwardly and foldable with relation to said main frame; a U-shaped seat supporting frame pivoted medially on said main frame and extending forwardly therefrom; a rectangular tray supporting frame pivoted at its forward part to the upper part of said supplemental frame; said rectangular tray supporting frame extending rearwardly and having its rear end pivotally connected with said U-shaped seat supporting frame; a flexible baby seat mounted on said U-shaped seat supporting frame; stop means associated with said U-shaped seat supporting frame and said tray supporting frame to limit the relative movement of said pivoting; and strap-like means connecting the forward center portion of said flexible seat with the center rearward portion of said rectangular tray supporting frame, there being leg holes at the forward edge of said flexible baby seat.

2. The construction specified in claim 1 in which the said rectangular tray supporting frame is pivotally connected at its opposite rearward corners to the ends of the arms of said U-shaped seat supporting frame.

ALFRED H. KELCH, Jr.

REFERENCES CITED

The following references are of record in the file of this patent:

UNITED STATES PATENTS

| Number | Name | Date |
| --- | --- | --- |
| 457,006 | Nesom | Aug. 4, 1891 |
| 1,557,263 | Millen | Oct. 13, 1925 |
| 1,633,864 | Klingelsmith | June 28, 1927 |
| 1,764,914 | Vande Mark | June 17, 1930 |
| 2,031,109 | Kersten | Feb. 18, 1936 |
| 2,168,513 | Cobb | Aug. 8, 1939 |
| 2,347,754 | Shay | May 2, 1944 |
| 2,378,931 | Kiesow | June 26, 1945 |